W. B. POTTER.
TROLLEY FOR TRACKLESS VEHICLES.
APPLICATION FILED JULY 29, 1909.
1,089,957.
Patented Mar. 10, 1914.
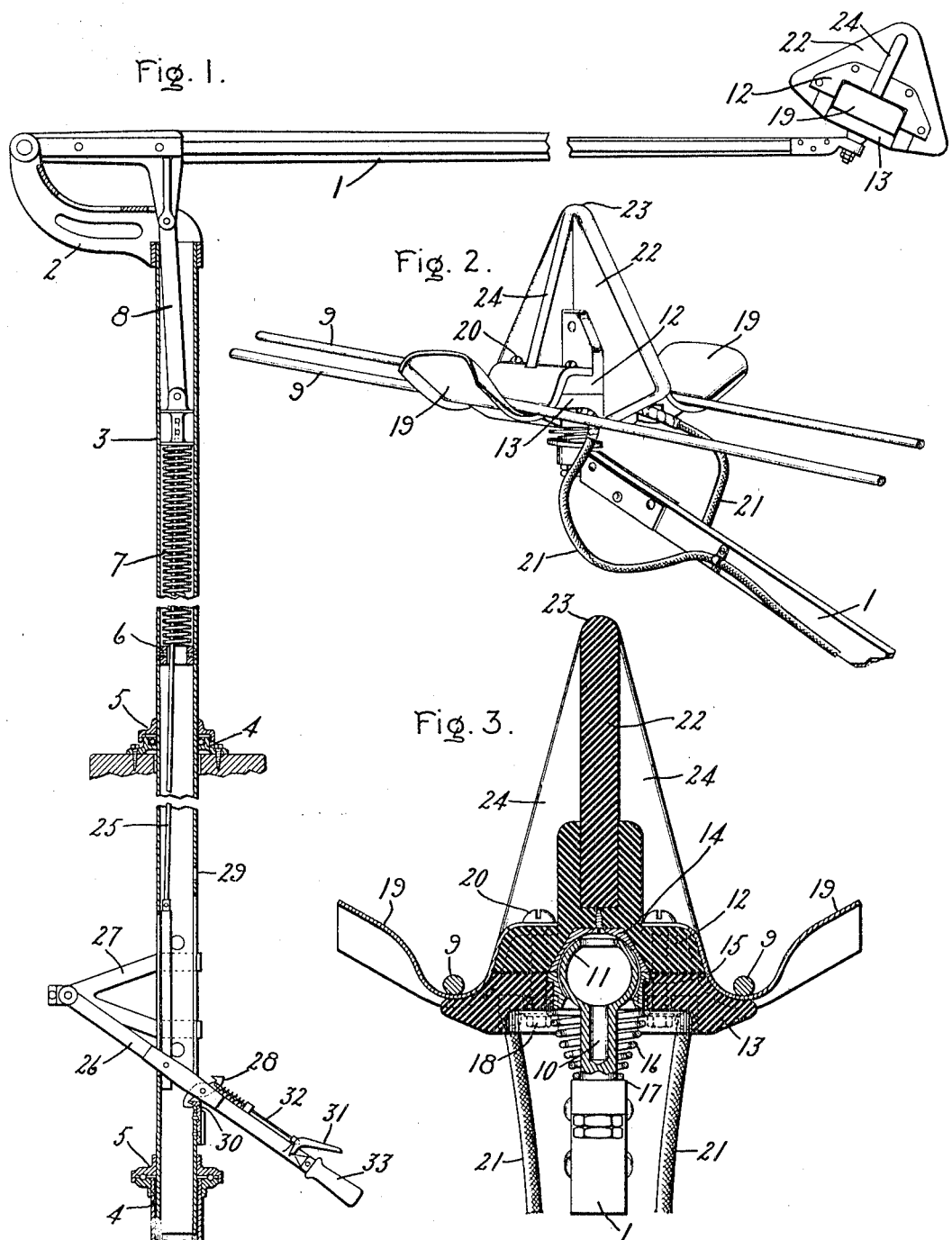
Witnesses:
George W. Tilden
J. Ellis Glen
Inventor:
William B. Potter,
by
Atty.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

TROLLEY FOR TRACKLESS VEHICLES.

1,089,957.      Specification of Letters Patent.      Patented Mar. 10, 1914.

Application filed July 28, 1909. Serial No. 509,990.

*To all whom it may concern:*

Be it known that I, WILLIAM B. POTTER, a citizen of the United States, residing at Schenectady, county of Schenectady, State of New York, have invented certain new and useful Improvements in Trolleys for Trackless Vehicles, of which the following is a specification.

This invention relates to electrically-driven vehicles which are adapted to run over a highway without tracks and to receive their power from two overhead parallel conductors, and it consists in a novel construction of trolley head whereby the engagement of said head with said conductors is rendered certain in almost every case, irrespective of the position of the vehicle or the angularity of the trolley pole with reference to said conductors.

The invention is particularly applicable to such a vehicle as is shown in my Patent No. 887,691, May 12, 1908, wherein the overhead conductor comprises two parallel wires conveying current respectively to and from the vehicles. The trolley head has a central insulating block which extends upward between the conductors and carries outwardly extending contact shoes adapted to engage the under side of said conductors. Flexible conducting wires are connected to the shoes and convey the current to and from the vehicle motor.

In the accompanying drawing Figure 1 is a side elevation of my improved trolley pole and head; Fig. 2 is a perspective view of the head applied to the overhead wires, and Fig. 3 is a cross section of the head, on a larger scale.

The trolley pole 1 is hinged at its lower end to a bracket 2 which is secured to the top of a tubular post 3 rotatable in bearings 4 in the body of the electric vehicle. The weight of the post and the parts which it carries is supported by collars 5 secured to said post and resting preferably on ball bearings. At some suitable point inside the post is a collar 6 forming an abutment to support the lower end of a compression spring 7 housed in the post and connected at its upper end, by a link 8, with the trolley pole. This spring urges the pole upward and keeps the trolley head in close contact with the two parallel overhead conductors 9.

At the outer end of the trolley pole is secured a stem 10 having a ball 11 at its top. The stem is preferably set oblique to the pole, so that when the pole is up and the trolley head is in contact with the conductors, said stem will be practically vertical. The trolley head comprises two blocks 12 13 of insulating material, preferably wood. They are arranged one above the other and each contains a bearing for the ball 11, so that the head is thereby swiveled to the pole. Each bearing has a metallic lining, the upper one 14 being semispherical, while the lower one 15 is annular, which leaves sufficient space around the stem to permit the head to rock on the ball through a considerable angle from the vertical. A coiled spring 16 encircles the stem, abutting at one end on a shoulder 17 on said stem, and at the other end against the under side of the block 13, preferably in a recess 18 in said block. This keeps the head normally level, and urges it toward that position when angularly displaced.

The contact shoes 19 are secured to opposite sides of the upper block 12, being preferably secured by the bolts 20 which clamp the two blocks 12 and 13 together. The shoes are somewhat U-shaped, and their front and rear edges are turned down to provide smooth rounded corners. Their outer upturned portions constitute retaining flanges which engage the overhead conductors and prevent their lateral disengagement. Insulated conducting wires 21, whose bared ends are soldered to terminal plates clamped by nuts on the bolts 20, extend down opposite sides of the trolley pole and convey current to the vehicle motor.

Rising between the contact shoes is a vertical longitudinal fin 22 which preferably projects beyond the blocks 12 13 both in front and behind and is securely fixed in a slot in the upper block. The edges of the fin taper upwardly to a blunt point 23, from which lateral wings 24 extend to the sides of the block 12, said wings also being tapered upwardly to the point 23. The fin is arrow-shaped, and with its wings constitutes a pyramidal crest rising above the head and readily insertible between the two overhead conductors no matter at what angle the trolley pole may stand thereto or how far to one side of said conductors the vehicle may be standing, and insures the positioning of the contact shoes on the wires for longitudinal travel thereon. This mode of operation is of especial value in vehicles of the class to which this invention has reference, because upon the meeting of two such vehicles using the same overhead conductors, it is necessary for both to turn out to opposite sides, and for the trolley on one to be disengaged from the conductors until the other vehicle has passed. The pyramidal crest of the head greatly facilitates the returning of the trolley to operative engagement with the conductors. If the point of the arrow is introduced between the wires at almost any horizontal angle other than a right angle thereto, the head will swivel and throw the contacts into operative position. The tapering wings guide the wires into the shoes as the head rises between said wires and swivels into line therewith.

In order to enable the driver to pull down and replace the trolley, a rod 25 is attached to the link 8 and runs down through the spring 7 to a lever 26 thrust through a slot in the post and fulcrumed on a bracket 27 attached to said post. A double-ended hook or latch 28 is pivoted on the lever and engages with a hole 29 or a lug 30 at the opposite ends of the slot in which the lever plays. A trigger 31 is pivoted on the lever and is connected with the latch by a rod 32; the trigger being adjacent to the handle 33 of the lever so that both can be readily grasped together.

When the driver pulls down the lever and locks it in the position shown in Fig. 1, the trolley is drawn down out of contact with the overhead conductors. Upon releasing the latch, the spring 7 throws up the pole, and the lever can be latched to the hole 29 to relieve the spring of its weight. The engagement of the lever with the slot in the post enables the driver to turn the post in positioning the trolley for engagement with the overhead conductors.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with a trolley pole, of a head swiveled thereto, and provided with a fin having lateral wings, said fin and said wings being tapered upwardly to a common point, and contact shoes on said head on opposite sides of said fin.

2. The combination with a trolley pole, of a ball mounted thereon, a head comprising two blocks containing bearings for said ball, a tapered fin on the upper block, and contact shoes on opposite sides of said fin and extending to or below the horizontal plane of the ball.

3. The combination with a trolley pole, of a ball mounted thereon, a head comprising two blocks containing bearings for said ball, a spring urging said head to a normally level position, an arrow-shaped fin on the upper block, and contact shoes on said head and extending to or below the horizontal plane of the ball.

4. The combination with a trolley pole, of a stem carrying a ball, two blocks containing a bearing for said ball, the lower block having a recess around said ball, and the upper block having a slot, an arrow-shaped fin in said slot, lateral wings on said fin, a spring surrounding said stem and seating in said recess, and U-shaped contact shoes on opposite sides of the upper block.

In witness whereof, I have hereunto set my hand this 27th day of July, 1909.

WILLIAM B. POTTER.

Witnesses:
 BENJAMIN B. HULL,
 HELEN ORFORD.